United States Patent
Pakhchanian et al.

(10) Patent No.: US 9,767,388 B2
(45) Date of Patent: Sep. 19, 2017

(54) METHOD AND SYSTEM FOR VERIFICATION BY READING

(71) Applicant: ABBYY Development LLC, Moscow (RU)

(72) Inventors: Aram Bengurovich Pakhchanian, Moscow (RU); Michael Pavlovich Pogosskiy, Moscow (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 318 days.

(21) Appl. No.: 14/508,382

(22) Filed: Oct. 7, 2014

(65) Prior Publication Data

US 2015/0278619 A1    Oct. 1, 2015

(30) Foreign Application Priority Data

Mar. 26, 2014    (RU) ................. 2014111518

(51) Int. Cl.
*G06K 9/03* (2006.01)
*G06K 9/62* (2006.01)
*G06K 9/20* (2006.01)

(52) U.S. Cl.
CPC ......... *G06K 9/6263* (2013.01); *G06K 9/2081* (2013.01); *G06K 2209/01* (2013.01)

(58) Field of Classification Search
CPC ........... G06K 2209/01; G06K 9/00456; G06K 9/00442; G06K 9/344; G06T 11/60
See application file for complete search history.

(56) References Cited

U.S. PATENT DOCUMENTS

| | | | |
|---|---|---|---|
| 5,359,673 A | * | 10/1994 | de La Beaujardiere ...... G06K 9/00442 382/229 |
| 8,249,399 B2 | | 8/2012 | Barkan et al. |
| 8,331,739 B1 | | 12/2012 | Casey et al. |
| 2002/0186885 A1 | | 12/2002 | Zlotnick et al. |
| 2008/0212877 A1 | | 9/2008 | Franco et al. |
| 2011/0192893 A1 | * | 8/2011 | Waugh ................. G06K 9/2036 235/375 |
| 2011/0239111 A1 | | 9/2011 | Grover et al. |
| 2014/0010452 A1 | * | 1/2014 | Wyle ...................... G06K 9/726 382/182 |

* cited by examiner

*Primary Examiner* — Eueng-Nan Yeh
(74) *Attorney, Agent, or Firm* — Lowenstein Sandler LLP

(57) ABSTRACT

An improved method for verifying whether a character-recognition technology has correctly identified which characters are represented by character images involves displaying the uncertain character images in place of their respective hypothesis characters in a document being read a verifier. The verifier may mark incorrectly spelled words containing the uncertain character images. Based on the markings, a system adjusts a confidence level associated with the hypothesis about the uncertain character in order to obtain a confirmed hypothesis linked to the uncertain character.

25 Claims, 10 Drawing Sheets

| 500 | | | |
|---|---|---|---|
| 502 | 504 | 506 | 508 |
| 1 | V | "Y" | 46% |
| 2 | R | "R" | 72% |
| 3 | M | "M" | 90% |
| 4 | G | "C" | 30% |

METHOD AND SYSTEM FOR VERIFICATION BY READING

CROSS REFERENCE TO RELATED APPLICATIONS

This application claims the benefit of priority under 35 USC 119 to Russian Patent Application No. 2014111518, filed Mar. 26, 2014; the disclosure of which is incorporated herein by reference.

BACKGROUND OF THE DISCLOSURE

Optical Character Recognition (OCR) is a technology by which scanned or photographed images of typewritten or printed text are transformed into machine-encoded/computer-readable text. In a typical procedure, the computer receives an image of text data and matches portions of the image to example character shapes/patterns. However, current OCR technologies still make mistakes in character recognition, confusing similar character shapes and, therefore, returning text with errors throughout. Such error-ridden text is not acceptable for most applications. Hence, after recognizing text, the errors must be removed from the text.

The common process for removing such errors is for the user to read completely through the recognized text and correct the errors manually. However, this is a time consuming and laborious task. The problem of correcting errors is made more difficult because the users may be unable to determine which letter in a word is wrong even if they recognize that the word is not correct.

SUMMARY OF THE DISCLOSURE

In one aspect, an example method includes receiving a set of uncertain characters obtained as a result of a recognition process of a text image. The received set of characters includes an image of an uncertain character, a hypothesis about the uncertain character, and a confidence level associated with the hypothesis. The method also includes causing a display device to present an image of the uncertain character over a text readout. Additionally, the method includes receiving marking data for the uncertain character and adjusting the confidence level associated with hypothesis about the uncertain character, in accordance with the received marking data, to obtain a confirmed hypothesis linked to the uncertain character.

In another aspect, an example computer-readable medium stores program instructions that, when executed, cause a processor to perform functions. The functions include receiving a set of uncertain characters obtained as a result of a recognition process of a text image. The received set of characters includes an image of an uncertain character, a hypothesis about the uncertain character, and a confidence level associated with the hypothesis. The functions also include causing a display device to present an image of the uncertain character over a text readout. Additionally, the functions include receiving marking data for the uncertain character and adjusting the confidence level associated with hypothesis about the uncertain character, in accordance with the received marking data, to obtain a confirmed hypothesis linked to the uncertain character.

In yet another aspect, an example system includes a communication interface and a processor. The communication interface is configured to receive a set of uncertain characters obtained as a result of a recognition process of a text image. The received set of characters includes an image of an uncertain character, a hypothesis about the uncertain character, and a confidence level associated with the hypothesis. The processor is configured to cause a display device to present an image of the uncertain character over a text readout. Additionally, the processor and communication interface are configured to receive marking data for the uncertain character and adjust the confidence level associated with the hypothesis about the uncertain character, in accordance with the received marking data, to obtain a confirmed hypothesis linked to the uncertain character.

DETAILED DESCRIPTION OF THE PREFERRED EMBODIMENTS

I. Example System Architecture

Functions and procedures described herein may be executed according to any of several embodiments. For example, procedures may be performed by specialized equipment that is designed to perform the particular functions. As another example, the functions may be performed by general-use equipment that executes commands related to the procedures. As still another example, each function may be performed by a different piece of equipment with one piece of equipment serving as control or with a separate control device. As a further example, procedures may be specified as program instructions on a computer-readable medium.

Figure 1:
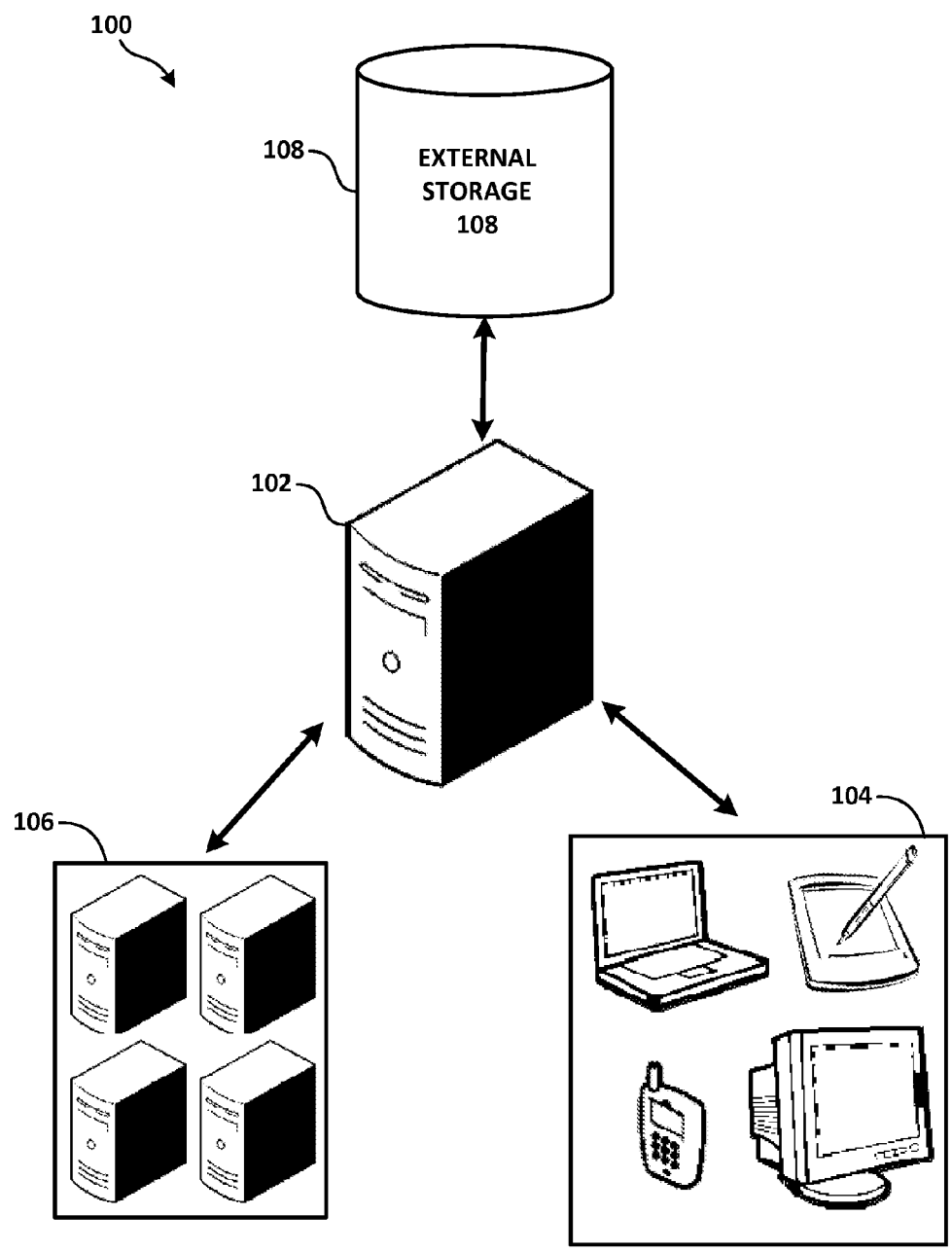
FIG. 1 is a simplified diagram illustrating aspects of an example network system according to an example embodiment.

FIG. 1 shows a networked system 100 according to an exemplary embodiment. As shown, the system includes a server 102 communicatively coupled to a set of remote viewing devices 104. In some embodiments, like the network shown in FIG. 1, server 102 may connect to the external storage 108, and/or external processing systems 106. Communicative links are formed between each of the elements of system 100. Such links may be any type of communicative connection. For example, the connections may be wired electrical connections, fiber-optic connections, air interfaces, indoor acoustic transmission networks.

Server 102 may be any generalized computing device that stores instructions for carrying out an exemplary process.

Alternatively, server 102 may be a specialized computing device configured to perform the certain functions needed with hardware. In still other embodiments, server 102 may be a set of various computing devices, either performing the same function or each configured to perform a specific function. Server 102 may typically include a computer-readable medium, processor, and communication interfaces, among other example components.

As shown in FIG. 1, remote devices 104 may be any of various device types. As will be explained below, devices 104 are used in some embodiments for reading text, generating marking data, and storing/analyzing that data in preparation for submission to server 102. Accordingly, any presently known or future device capable of these functions may be used as a device 104. Some non-exclusive examples include, e-readers, tablets, laptops, smartphones, video phones, televisions, desktop computers, PDAs and/or fax machines.

Servers 106 and memory 108 are example auxiliary connections that may be associated with functions of an exemplary process. For example, servers 106 may be accessed to provide additional computing power to server 102. As another example, servers 106 may be particular OCR engine servers, such as ABBYY FlexiCapture or ABBYY Recognition Servers.

Figure 2:
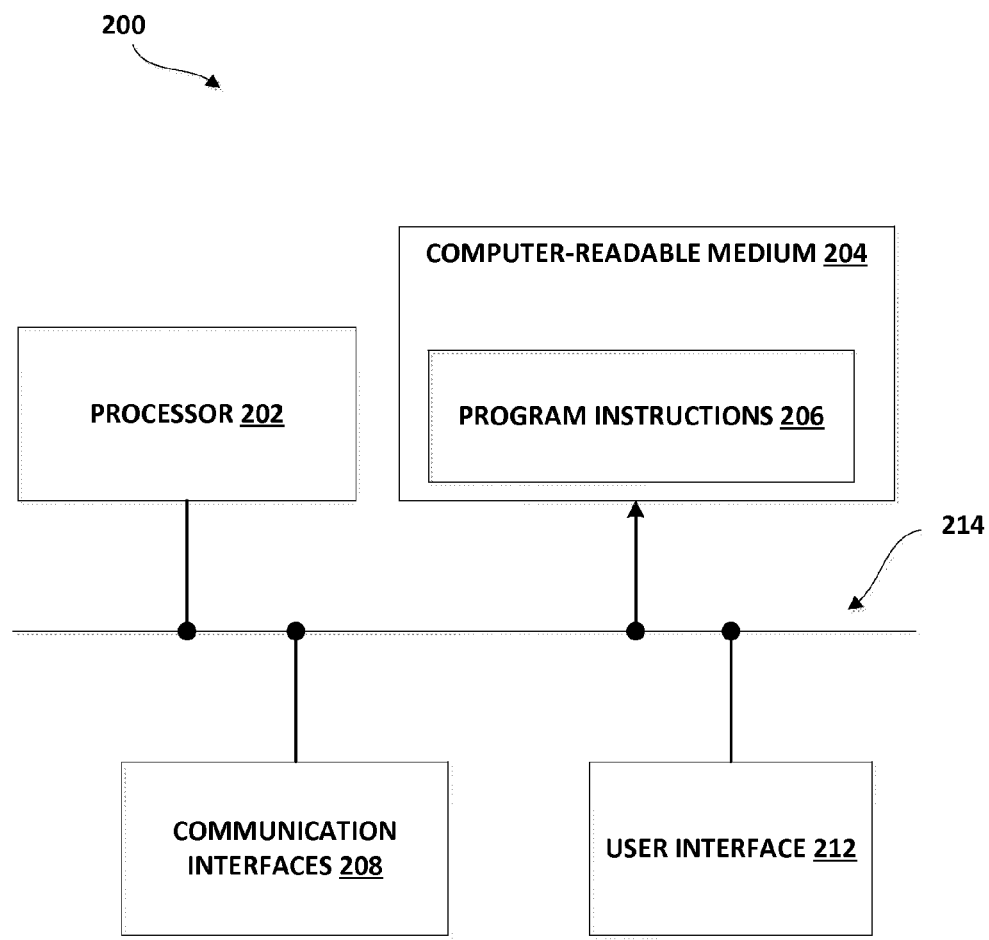
FIG. 2 is a block diagram illustrating aspects of a computing device according to an example embodiment.

One example device (200) is shown in FIG. 2. As shown, device 200 includes processor 202, computer-readable medium (CRM) 204, communication interfaces 208, and user interface 212 all connected through system bus 214. Also as shown, program instructions 206 are stored on computer-readable medium 204. In the present disclosure, this device may be seen as an embodiment of either server 102 or remote verification device 104.

Processor 202 may include any processor type capable of executing program instructions 206 in order to perform the functions described herein. For example, processor 202 may be any general-purpose processor, specialized processing unit, or device containing processing elements. In some cases, multiple processing units may be connected and utilized in combination to perform the various functions of processor 202.

CRM 204 may be any available media that can be accessed by processor 202 and any other processing elements in device 200. By way of example, CRM 204 may include RAM, ROM, EPROM, EEPROM, CD-ROM or other optical disk storage, magnetic disk storage or other magnetic storage devices, or any other medium that can be used to carry or store desired program code in the form of program instructions or data structures, and which can be executed by a processor. When information is transferred or provided over a network or another communications connection (either hardwired, wireless, or a combination of hardwired or wireless) to a machine, the machine properly views the connection as a CRM. Thus, any such connection to a computing device or processor is properly termed a CRM. Combinations of the above are also included within the scope of computer-readable media.

Program instructions 206 may include, for example, instructions and data capable of causing a processing unit, a general-purpose computer, a special-purpose computer, special-purpose processing machines, or server systems to perform a certain function or group of functions.

Communication interfaces 208 may include, for example, wireless chipsets, antennas, wired ports, signal converters, communication protocols, and other hardware and software for interfacing with external systems. For example, device 200 may receive text, audio, executable code, video, digital information or other data via communication interfaces 208 from remote data sources (e.g., remote servers, internet locations, intranet locations, wireless data networks, etc.) or from local media sources (e.g., external drives, memory cards, specialized input systems, wired port connections, wireless terminals, etc.) Example communication networks include Public Switched Telephone Network (PSTN), Public Switched Data Network (PSDN), a short message service (SMS) network, a local-area network (LAN), a voice over IP (VoIP) network, a wide area networks (WAN), a virtual private network (VPN), a campus area network, and the Internet. An example network may communicate through wireless, wired, mechanical, and or optical communication links. Many other communication networks may also be suitable for the embodiments discussed herein.

User-interface 212 may facilitate receiving user-input and user-commands into device 200 and outputting information and prompts for presentation to a user. Although such interfaces typically connect with human users, user-interface 212 may alternatively connect to automated, animal, or other non-human "users". Additionally, while input and output are described herein as occurring with a user is present, user-interface 212 need not present information to any actual user in order for present functions to be performed. User-input may be received as, for instance, wireless/remote control signals, touch-screen input, actuation of buttons/switches, audio input, motion input, lack of interaction for a pre-defined time period, and/or other user-interface signals. Information may be presented to the user as, for instance, video, image presentation, audio signals, text, remote device operation, mechanical signals, media file output, etc. In some cases, separate devices may be operated to facilitate user-interface functions.

An example system may also include a variety of devices or elements other than those shown in FIG. 2. For example, device 200 may include visual displays or audio output devices to present results of an example process. As another example, CRM 204 may store computer applications for specific data-generation or data-processing functions. Other examples are possible.

II. Example Methods

Figure 3:
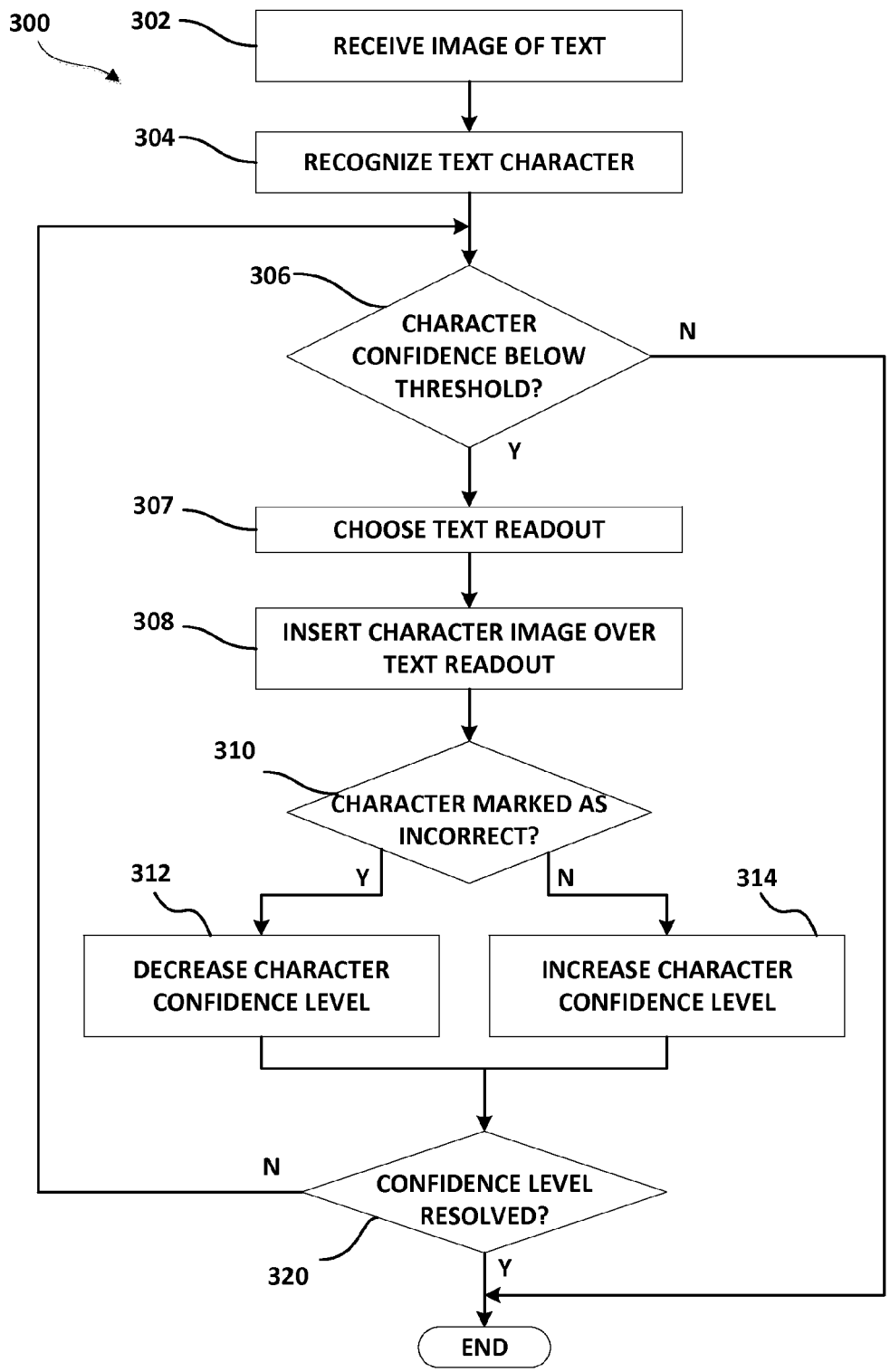
FIG. 3 is a flowchart diagram illustrating aspects of a method according to an example embodiment.

FIG. 3 illustrates a method 300 according to an exemplary embodiment. As shown, method 300 includes receiving an image of a set of text (step 302). Method 300 also includes recognizing at least one text character from the received image (step 304). However, since the character may have been incorrectly recognized by the system, method 300 further includes making a determination of whether a confidence level associated with the recognized text character is below a predefined non-zero threshold value (step 306). If the character confidence level is above the threshold, then method 300 continues on to step 320. If the character confidence level is below the threshold, then a text readout is selected (step 307) and the image representing the character is inserted into the text readout covering a portion of the text readout (step 308). After inserting the character into the text readout, method 300 includes determining whether the character was marked as incorrect by a user-verifier (e.g., a user who verifies the text or checks the text for errors) or not (step 310). If the character was marked as incorrect, then the character confidence level is further decreased by the system (step 312). If the character was not marked as incorrect (or was marked correct), then the character confidence level is increased.

In some cases, the threshold value may be variable to indicate desired accuracy level of verification. For example, a certain recognition project may have a goal of no more than a predefined number of uncertain characters to be left. Uncertain characters are characters that may have been recognized by the program incorrectly. The threshold value may be altered automatically by the system (in response to receiving a command indicating the maximum number of uncertain characters) so that a set of the lowest confidence characters is organized in the amount requested. In other cases, the system may determine the threshold value based on the relative average and spread of the confidence levels. For example, the threshold value may be reduced if all of the characters are less likely in a particular set of text.

Although steps 302 and 304 are shown as a part of method 300, some embodiments may include receiving the image and the recognized text together. In other cases, the image data may be received on its own. In still other cases, "receiving" the image may mean generating the image at the device and then receiving the image to a processor from local memory. If step 304 is performed, any OCR engine may be used at step 304 to recognize text, for instance, ABBYY FlexiCapture or ABBYY Recognition Server.

After the document has been recognized, an image and the set (hypothesis, confidence level) are obtained for each character. The hypothesis in this case may be the character that the OCR process associates with the image data for the character. The confidence level may be a numerical value (such as a percentage) or qualitative descriptor indicating how likely the hypothesis is to be true.

As shown in step 306, the characters for which the hypotheses have a confidence level less than the threshold value may be designated uncertain characters or wrong characters. These characters may be placed in a separate array from the high-confidence characters. This array of uncertain characters is the array of characters that may be verified and stored in a long-term memory device. In cases where the image and text are received in an already recognized state, the received data may also already have the characters sorted into uncertain characters and right characters (i.e., characters with high confidence levels).

There are a certain number of remote devices 104 that are accessed at step 308 to insert the images of the uncertain characters over text being read. The devices may be assigned to the process from the beginning (for example, the devices are associated with employees of the company doing the project) or they may be devices associated with volunteers participating in the project voluntarily. The following actions may be performed with each of type of device, independently of each other.

As shown in step 307, a user-verifier, working on a remote viewing devices 104, selects a text readout to use in verifying an uncertain character. In some cases, this is the text readout that a user wants to read. This can be any text, such as one the user wrote themselves, found on the Internet, recognized, or an e-mail, a forum, or in general any text document. In other words, the text readout is a different file and/or a different piece of text than the received image of text. Indeed, it may be preferable for the text readout to be unrelated to the original recognized document, to avoid the original context.

Next, the uncertain characters selected for a respective device are inserted (308) in the text that was selected by the user. This means that the system identifies the hypothesis characters of the uncertain characters in the selected text and inserts the image of the uncertain characters over the identified characters, so that, instead of the hypothesis character, there is the image of the uncertain character. The renewed text is sent back to the device.

After that, the user of the machine may read the two-layered text. If the user supposes that a word is spelled incorrectly, then the user taps (in case of the touchscreen device), or clicks (in the case of a non-touchscreen device) at the entire word. Other selection products may be used (such as gaze detection or spoken commands.) In some cases, when an incorrect word is marked, the image of uncertain character or the image of word is removed from the document, such that the user may see the plain text in the area where the uncertain character was formally displayed. In this way, the user may understand that the mark is accepted.

Statistics about the hypothesis about the uncertain characters may be gathered with the tap/click, and as the internet connection appears, the data may be sent back to server 102. When no tap/click is registered, the device may recognize that the verifier has moved onto a new page, book, etc. so that such an action indicates that the word is not incorrect. Additionally, a first tap/click followed by a second tap/click may indicate that the word was selected and verified to be the correct.

After data may be sent back to server, and the uncertain characters may be removed from the verification devices 104.

After data gathered by the remote verification devices 104 arrives at the server, statistics about all the tried hypotheses are updated. Thus the confidence value for each hypothesis may be increased or reduced. Depending on the updated value of confidence, the system may determine whether the hypothesis needs additional verification or whether the confidence level of the hypothesis is resolved (step 320). If the value exceeds a selected threshold value, then the hypothesis is confirmed (i.e. it is considered true and the uncertain character is verified); if the confidence is below the selected threshold value, but above a selected minimum value of confidence (for example, 0% in case of measuring confidence in percentage), then the hypothesis is transmitted to the additional verification step (the character with the corresponding hypothesis is added to the new set of uncertain characters with appropriate hypotheses, which is sent to the next user-verifier); if the confidence is less or equal to a selected minimum value of confidence, than the hypothesis is refuted (i.e. it is considered false and excluded from the list of hypotheses about a particular uncertain character). After each verification step, (at step 320) the resulting confidence levels or number of acceptable uncertain characters may be analyzed to determine whether the process of the document verification is done. In some cases the determination that the verification process is complete may be that a particular number of uncertain characters have been reached. In other cases, the completeness may be that no character has a confidence level less then threshold value. In such a way, the program may keep repeating until the correct results have diverged from the incorrect results (i.e., the system has reached the level where all the character recognition's uncertainties are resolved). This level may vary from document to document, depending on our requirements for quality (accuracy) of recognition and verification.

In some cases an original image is received by the server (102). The original image may be an image from a scanned book, a magazine, a newspaper, a document, or any text information represented in graphic form. The text may be written in any sufficiently well-known language.

The scanned images may be in PDF, JPEG, TIFF, JPEG 2000, BMP or other formats. In one embodiment the recognition process can be realized on external processing systems 106 and performed by any known method. As a result of the recognition process the following information may be produced:
- the recognized character
- the single character image
- the layout (coordinates) of a image of a single character
- the numerical parameter representing the confidence of recognition.

Figure 6A:
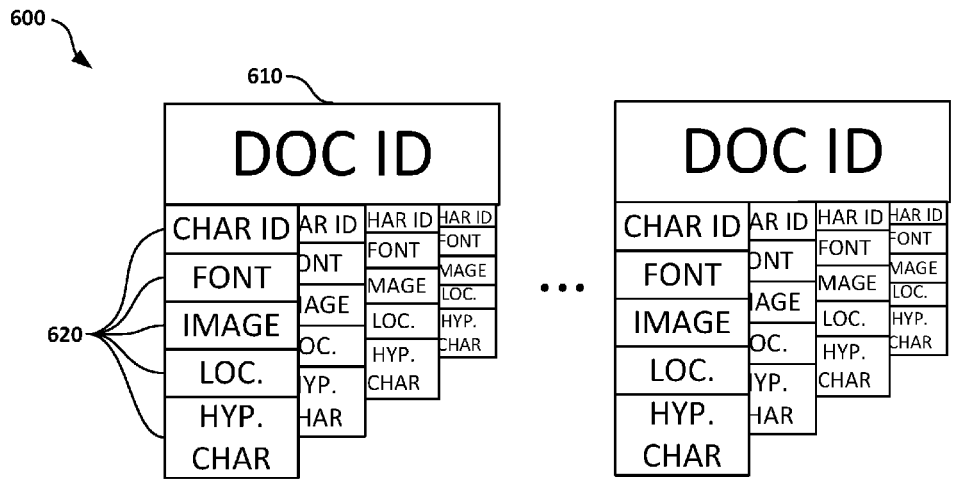
FIGS. 6A and 6B illustrate an example structure of an array of uncertain characters.

A recognized character set that is aggregated within the document, is returned to the server (102). Each document has a unique identifier, a Globally Unique Identifier (GUID), in the context of the project. The project may include several documents. Each document character set may correspond to a one-dimensional array. Set of arrays forms the array corresponding to the project included several documents. FIG. 6A illustrates the structure of the array corresponding to the project included several documents (600). Each document array 610 may also consist of elements (620). Each array element (620) in the document array may include a sequential number for the character in document (an ID for the character), font characteristics of the character, the image of the character, the coordinates of the image (e.g., location or Loc.) of the character and a set of hypotheses about the character ordered by the level of confidence. Other information could also be included.

Figure 6B:
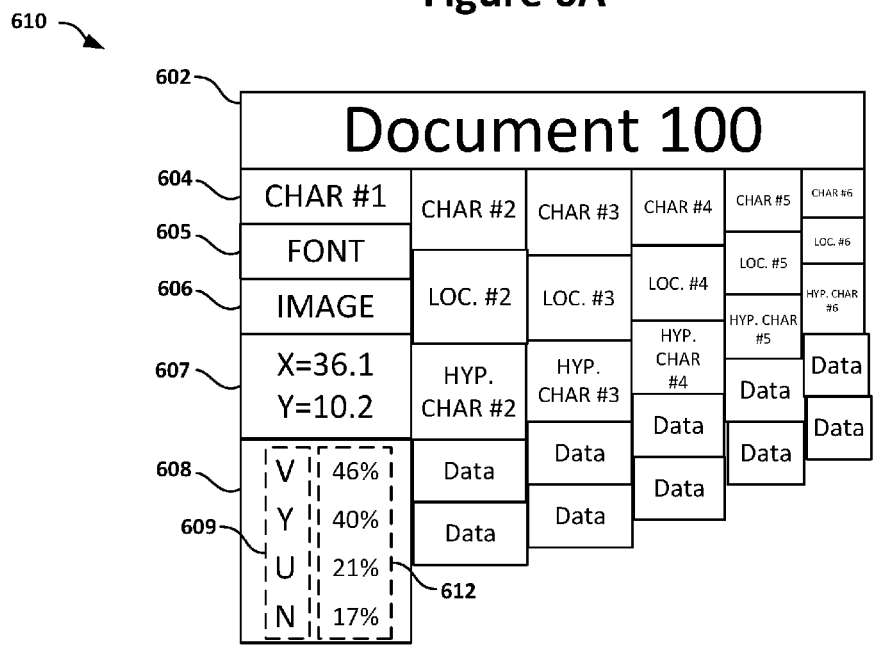

FIG. 6B shows a particular example of an array corresponding to the document. As shown, the document ID 602 (Document 100) is stored with an array of characters, including CHAR #1 604 which has font characteristics 605, image of character 606, coordinates 607, and a hypothesized set of characters 608, including a list of potential characters 609 and a confidence value 612 associated with each potential character.

Each character that is produced as a result of the image recognition is associated with the corresponding percentage of confidence in the character. Those characters for which the confidence percentage is less than the cutoff percentage (i.e., a threshold value of confidence that is a designated limit of uncertain characters (wrong characters) and certain characters (right characters)) will be verified using the method described. Those for which the confidence percentage is greater than the cutoff need not intend verification. In some embodiments, different types of confidence level may be used instead of a percentage.

Depending on external circumstances (client order, deadline for the order, quantity of documents, desirable quality of the recognition), the number of characters to be verified may be increased by increasing the cutoff percentage. If the number of characters to be verified must be reduced, that can be done by reducing the cutoff percentage. For example, if the client needs 100% quality, then each recognized character can be verified (100% cutoff) so that there may be no false positives in the documents sent to client. For example, if 5 mistakes per page are not too much for the client, it can be verified just those characters with a confidence level, say, below the 70% cutoff.

The idea is based on the fact that the verification may be performed not so much by employees of the company, but by volunteers doing the project as "remote" users (i.e., as remote assistants). Verification consists of the installing an application on a device in which the method of FIG. 3 may be implemented and using this application for reading arbitrary texts (i.e. texts that may be different from the texts that were recognized).

Uncertain recognized characters may be typewritten with different font characteristics. Some font characteristics include font face (Times New Roman, Arial, etc.), font size and font style (italic, bold and etc.). For better perception of whether a word is correct, the font characteristics of the text readout may be chosen to match the font characteristics of the recognized text from which the uncertain characters are taken, or be similar to them.

This can be accomplished by one of several methods described below.

In one embodiment, a user-verifier chooses a text readout from a repository of literary texts on the server (102) or a connected device. Before this text is sent to the remote verification device (104), the font characteristics may be adjusted such that the appearance of the selected text readout matches the appearance of the recognized text containing the uncertain characters.

In another embodiment, the characters may be chosen from the array of characters on the server (102) that are being verified at the present time such that those characters are associated to corresponding language and their font face, font size, font style may be the most similar to those one used on the verification device (104) (i.e., most similar to the font characteristics of the text readout).

If the recognized text is composed of several fonts, the characters from the recognized texts can be structured by font. In this way, an array can be formed.

The array for a specific user and a specific book/page can consist of characters from only a single font. In another possible embodiment, the array may include characters marked italic, bold and etc., in case of different text formatting being used on the physical verification device such as, for example, epigraphs, footnotes, headers or subheaders.

If the text was hand written or otherwise without consistent font/size characteristics, then server 102 or device 104 may be programmed to choose a font and size that is closest to the given text.

Figure 10:
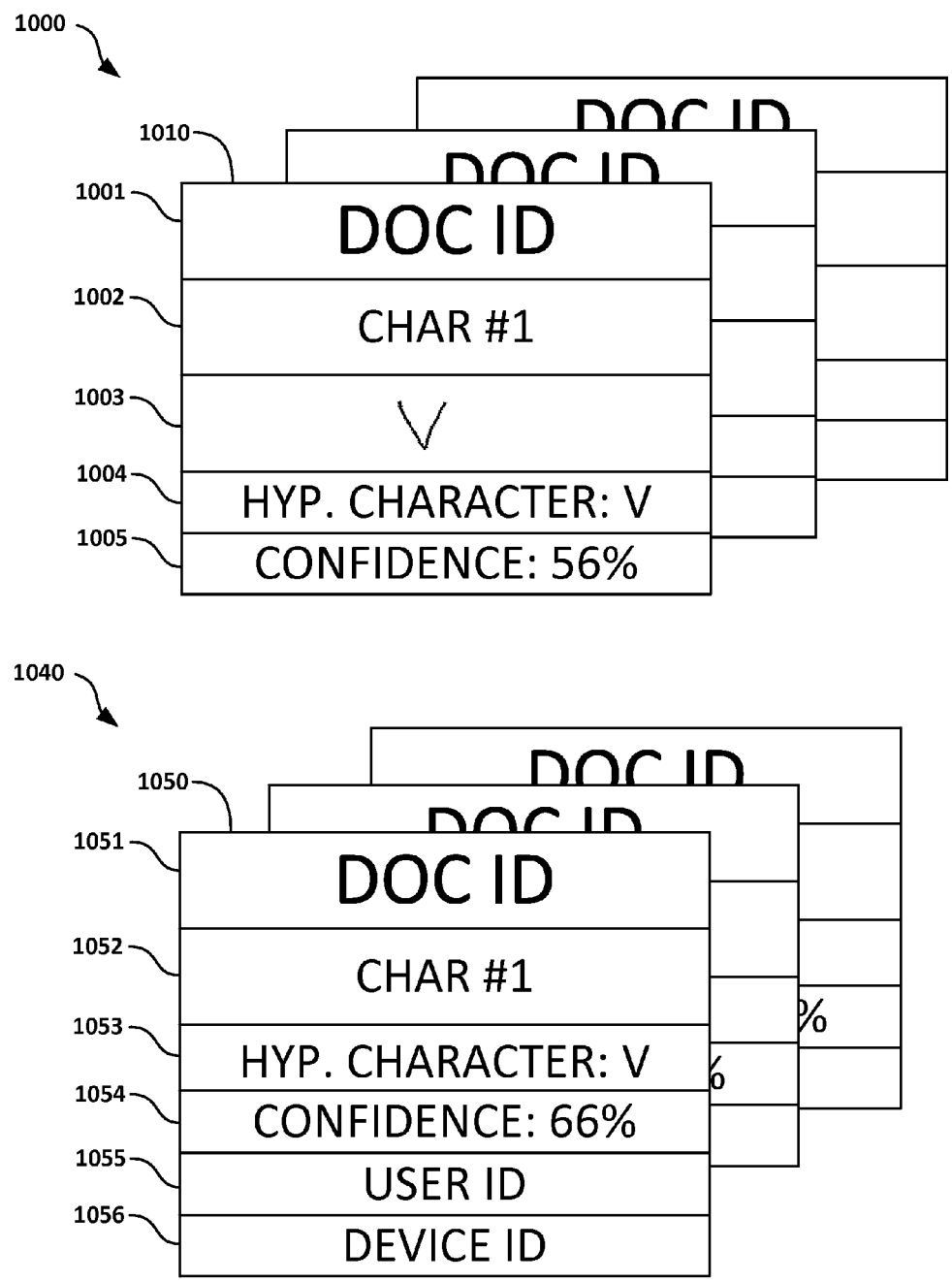
FIG. 10 illustrates example structures of uncertain characters arrays according to an example embodiment.

The array of uncertain characters may be first taken from the server (102) to the verification device (104). Then the corresponding array of verified data is sent back to the server. FIG. 10 shows the structure of the array elements sent from server 102 to device 104 and the structure of the array elements being sent back to server 102 from device 104.

In FIG. 10 the structure of the array elements sent from server to device is shown. Each of these array elements (e.g., 1010) consists of a document number (DOC ID 1001), an ID for the character in the document (1002), an image of the character (1003), a hypothesis about the character (1004), and a confidence level corresponding to this hypothesis (1005).

In FIG. 10 the structure of the array elements sent back to the server from device is shown. Each of these array elements (e.g., 1050) consists of a document number (DOC ID 1051), a ID for the character in the document (1052), a hypothesis about the character (1053), a confidence level corresponding to this hypothesis (1054), a user-verifier ID (1055), and a device ID (1056).

In one embodiment, the book may be transferred separately from the array, i.e., the array is attached to the book at the user's device (tablet, smartphone or notebook). In another embodiment, this can be done on the server. If the user-verifier reads the text in the browser, the images of characters can be incorporated using a plugin. For example, the user can read an e-mail or forums, and the plugin can be used to incorporate the images. A plugin can also work with any applications on a computer/smartphone/tablet and replace characters with images of characters/images of words everywhere. In the case of reading text in the browser only the array is transferred.

In one embodiment, verification device may receive the entire book. In other embodiment, the verification device can receive one chapter at a time, or one page at a time, and so on. An advantage of breaking books down into pieces is that if there are many user-verifiers working with a platform and they read quickly, the characters are verified multiple times. The advantage of loading of a whole book is that this is more convenient for a user-verifier if the Internet connection has limited transmission capacity. In various embodiments, either approach may be used.

The verifier can read a text with images on any of electronic devices 104 that can visually reproduce the text and accept requests from the verifier. The example of an electronic device can be an electronic book (with or without a touch screen), a smartphone, a notebook, a media player, or a projector.

In one embodiment, the verification can be done when reading from a touchscreen mobile device. In this embodiment, the user-verifier will read the text from the screen and mark the incorrect words using the same screen.

The method benefits from the fact that a user can immediately see an error in a word, even if he does not know exactly what the error is. This may occur automatically and depend on how much the user has read. According to some researches, a human can easily recognize a word with errors, without the flawed words disrupting the human's understanding of the text. This is a basic difference in the present method—the user marks wrong words, and not letters. A word may contain more than one inserted character and the user need not think about which specific inserted letter was improperly inserted. The marked word is equal to selecting all inserted uncertain characters within the whole word as incorrect, i.e. as uncertain characters having the false hypotheses.

"Marking" here means that a user-verifier clicks, taps, or presses the word, in other words, he points it out in one way or another. This may be done by any known way, depending on the way the method is implemented and the type of device (104) is used for verification.

If a user-verifier reading the text notices a word, which is not spelled correct in his opinion, he can tap (or click) in the area of that word. When such a tap (or click) is performed, all the images of the characters from the area of the word (or the image of the word itself in another embodiment) are removed, and the user may see the plain text in the area where the uncertain recognized character was formerly displayed.

The data about user-selection of words as improperly spelled is recorded. This data may be stored in the user's device, for example, on an embedded flash memory or on a memory card or somewhere else in a built-in memory of device, depending on an embodiment of the method. In some embodiments described, the data may be stored in array consisted of elements each of which may include: a document number 1051, a sequential number for the character 1052 (an ID for the character), a hypothesis about the character 1053, the confidence level for the hypothesis 1054, the user ID (1055) and the device ID (1056). When there is an Internet connection, the data is sent to the server. The method used to connect to the Internet, like the method (protocol) for sending data, may be any of those currently used or any others if they provide a connection and data transmission. The information sent may contain:

a. An identifier for a user-verifier (this may be a login, a user name, or any other unique ID), b. A device identifier (to distinguish tablets, desktops, smartphones with a touch screen and etc.), c. The results of verification (document number, character sequential number, etc.)

If the verification device (104) is an electronic book or another device that doesn't have its own module for connecting to the Internet, these data may be sent to the computer using any standard interface, wireless or wired, such as a USB, and then loaded onto the server.

If the user is reading from a non-touchscreen device, he places the cursor on the word in some manner (using a mouse, moving the cursor with the keyboard, or using buttons on the device) and then presses it.

The user may reject his selection. This may be done in various ways. In one embodiment a selection may be treated as rejected in response to detecting that the same word is selected again. In another embodiment, there may be a special "Reject" button that performs this function in the form of hardware or software. Beside that the selection may be changed with a special movement on the touch screen.

The book that the user reads and verifies may consist of two or more visual layers. The lower background layer may contain the ordinary text, such as in plain text format. The next layer may contain images of characters or images of words proposed for verification as part of this method. Other layers may have additional information, such as about the number of pages read, the number of characters already verified, the personal rating of the verifier, and so forth.

Figure 7:
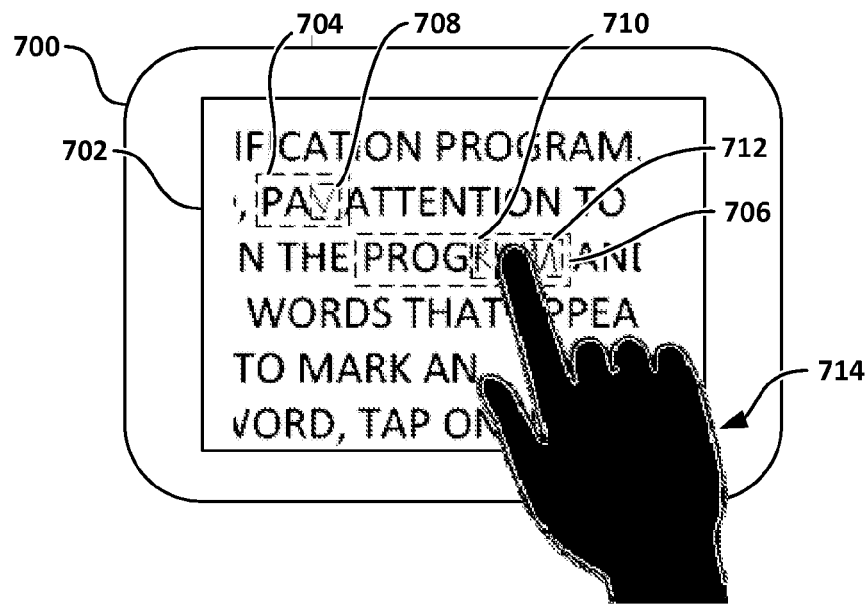
FIG. 7 is an illustration of a user-interaction with a verification device according to an example embodiment.
Figure 7:
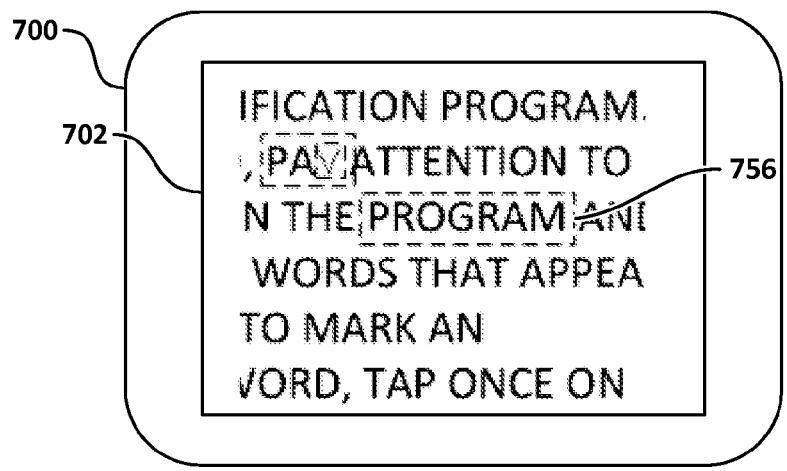

FIG. 7 demonstrates a screen (702) of a device (700). The screen has text in which images of characters (708, 710, 712) or words (704, 706) may be inserted. As shown, a user may mark a word by pressing the area (706) where the word is located. An example of a user pressing (714) on a word (706) is shown on the device screen (700). FIG. 7 also shows screen 702 of device 700, which is an example of how device 700 may look after the pressing step (714) illustrated. As shown, word 706, which contained images 710, 712, 706 for verification, has been changed to word 756, which contains no verification images.

Figure 8:
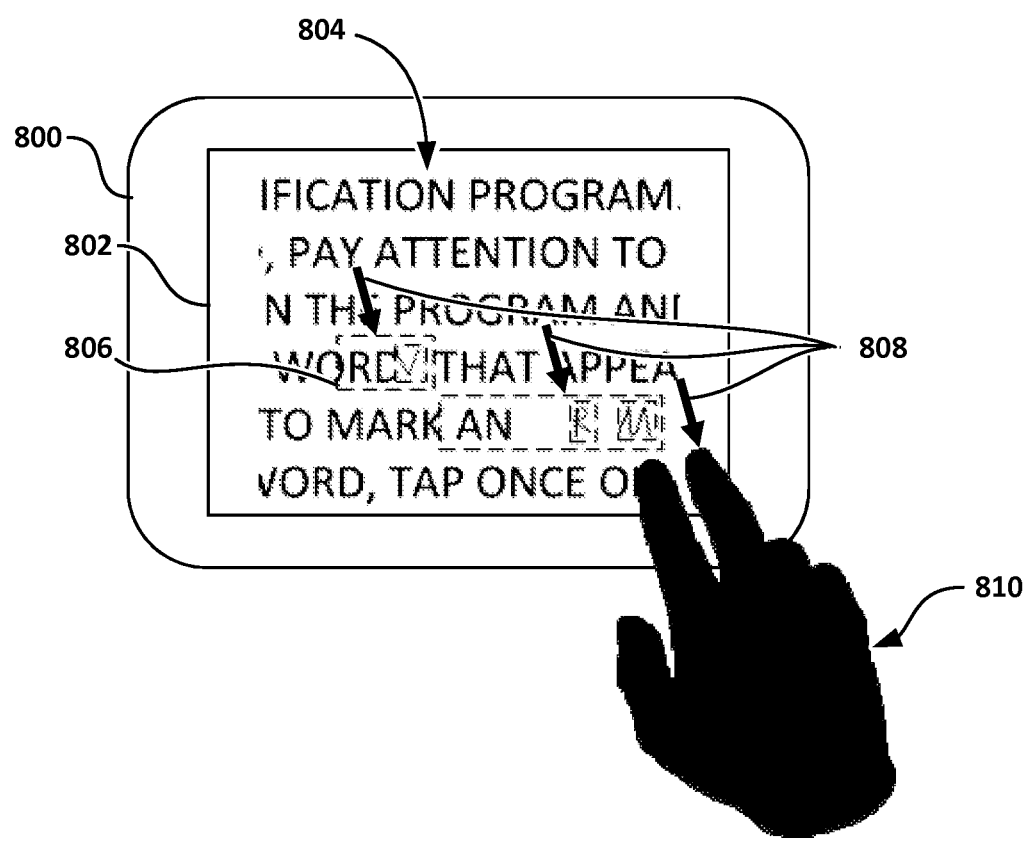
FIG. 8 is an illustration of a user-interaction with a verification device according to an example embodiment.

For multi-touch screens, one can provide for the use of two fingers to move the image layer in order to see what lies beneath it. FIG. 8 illustrates this approach. It shows a picture of a multi-touch screen (802) of a device (800) with text (804) and an image layer (806). The image layer (806) is moved in a direction (shown by arrows 808) by hand (810), which contacts the screen (802). The images (806) are moved in a direction (808) and the text 804 that were formerly hidden beneath the images (806) have become visible.

Each of the images of the words (or images of the characters above the words) can be accepted (increasing confidence), or marked as wrong (reducing confidence), or marked and then rejected (strongly increasing confidence). The character is accepted if the user did not click/tap on the area of the word. The character is marked as wrong if the user clicked/tapped on the word. The character is marked and rejected if after marking it as wrong, the user again clicked/tapped on the word.

After verification, i.e. when the user has finished reading the text, and there is an Internet connection, the data from the user's device may be sent to the server.

After the data are received from the next successive user-verifier, the confidence values for the characters involved in the verification may be changed to take the user-verifier's opinion into account. This may be done as follows:

Let $m_1$, $m_2$, $m_3$ be the number of acceptances (unmarkings), the number of markings of a character (words that contain the character) as wrong, and the number of rejections respectively (a rejection is an action that "takes away" an already placed marking of the character as wrong).

Then the confidence of the hypothesis about a specific character after data may be obtained from a specific user can be computed using the formula:

$$i = \frac{(k_1 m_1 + k_2 m_2 + k_3 m_3)}{m_1 + m_2 + m_3},$$

where $k_1$, $k_2$ and $k_3$ are numerical coefficients that are used to count the acceptances of a character (or word in which the character appears) (unmarkings), markings of a character (or word in which the character appears) as wrong, and rejections of markings respectively.

The values for the coefficients may be determined by the system developers at the development or adjustment stage. In one of the possible embodiments, the values for the coefficients may be dynamic and determined as a function of external conditions.

Figure 4:
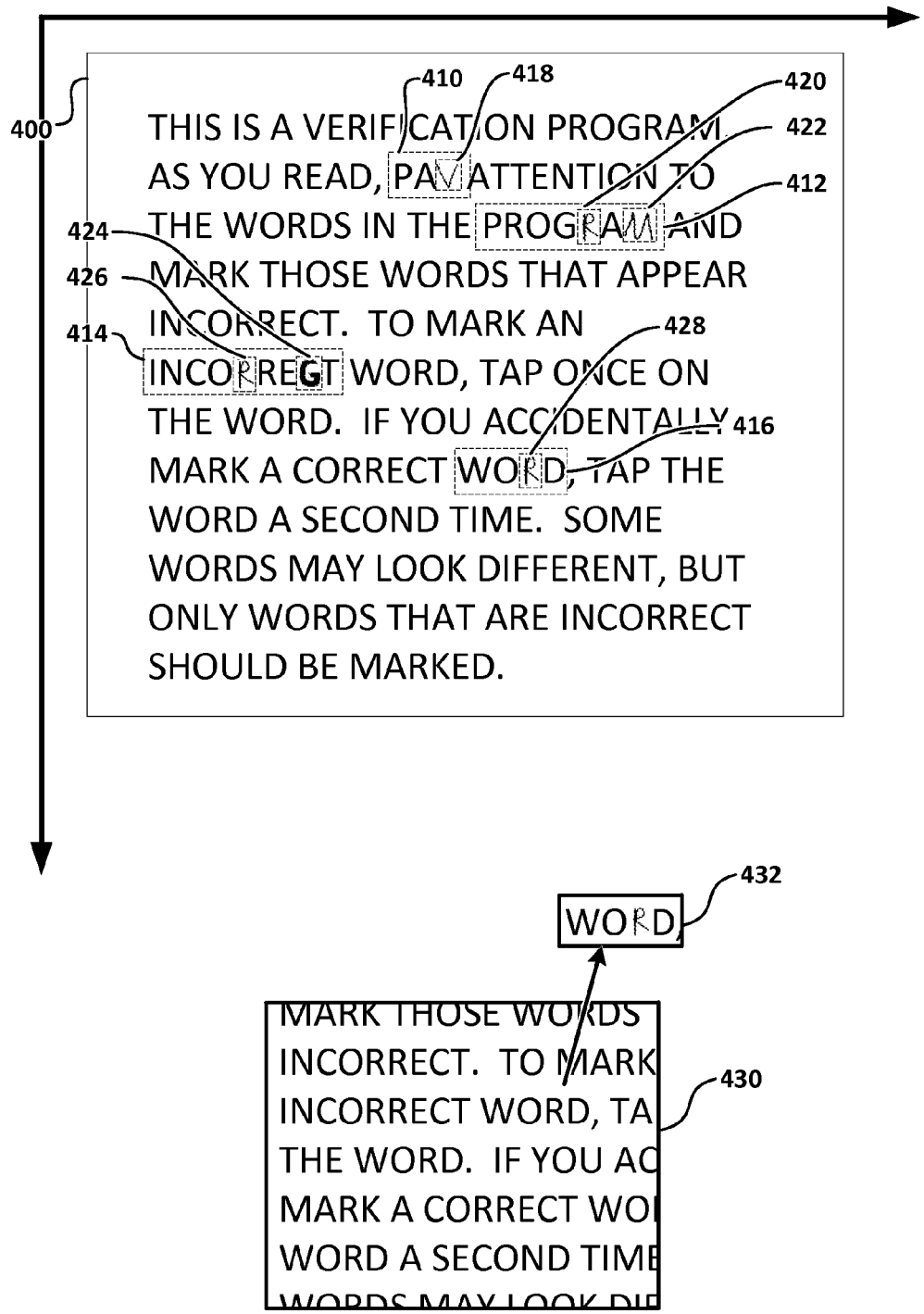
FIG. 4 is an illustration of a graphical user-interface according to an example embodiment.

FIG. 4 shows two example displays 400 and 430 of a two-layer text readout with images of uncertain characters displayed over some words. As shown, four words 410, 412, 414 and 416 have uncertain characters 418, 420, 422, 424, 426, and 428 displayed over the text readout. In window 400, the character images are over the text readout, blocking original characters. In window 430, word 432 has been tapped/clicked, moving image of word 432 away from window 430. As shown, the original text, which was below word 432, is now visible. In this way, a user-verifier may check to ensure that the word is in fact incorrect (rather than just being unfamiliar).

Figures 5A, 5B:
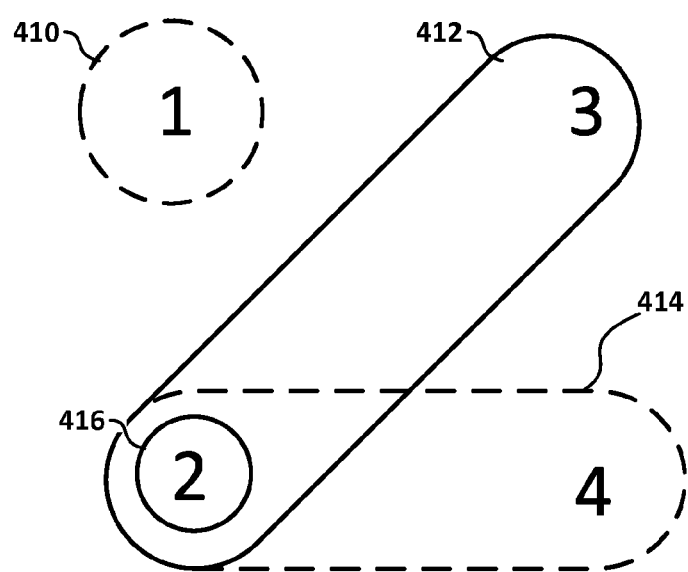
FIG. 5A is a table showing aspects of a uncertain character array.
FIG. 5B is a state chart visualizing the connections between uncertain characters in the text shown in FIG. 4.

FIGS. 5A and 5B illustrate other aspects of the example of FIG. 4. FIG. 5A illustrates a table showing aspects of the uncertain character array 500. In this case, the characters intended for verification (418-428 from FIG. 4) have a confidence level less than the threshold value of 95%. The characters (418-428) are sequentially numbered in the document; they have a character number (502) in the document (400), an image of the character (504), a hypothesized character (506), and the confidence levels (508) of the hypotheses. For this example, the user-verifier may select the words "PAV" and "INCORREGT" as containing wrong characters.

The characters intended for verification (418-428) are placed in the text selected by the user-verifier. The text (400) contains the words (410-416) into which the uncertain characters (418-428) have been placed, in particular, the words that the user may select as wrong. The text (430) illustrates the text (400) after the user has selected word 416.

FIG. 5B demonstrates the characters (418-428) that correspond to sequential numbers (502) in the table (500). The characters joined by dotted lines (410 and 414) were within the words that were selected by the user as wrong. The characters joined by a solid lines (412 and 416) were in the words that were not marked by the user as wrong.

The confidence level of a hypothesis about a character may be computed using the following formula:

$$I_n = I_{n-1} + i \cdot L, \quad (2)$$

where L is the user-verifier's rating, $I_n$ is the new confidence value for a specific hypothesis about the character, and $I_{n-1}$ is the confidence value for a specific hypothesis prior to considering data from a user-verifier with rating L.

In various embodiments, these formulas may be computed either on the server or on the user's device. In an embodiment described in detail in this application, formula (1) is computed on the user's device and the result of the computations is stored on the user's device, for example, in embedded flash memory or on a memory card, in an array, and in the field for hypothesis confidence level. This is also transferred to the server as an array, and formula (2) is computed on the server after data are received and when the confidence levels for the hypotheses are updated.

The data are loaded onto the server as an array. The array consists of elements, each one of which consists of a document number, a sequential number for a character in the document, the ASCII code for the hypothesis, the confidence level for the hypothesis, the user-verifier ID and the device ID.

The user-verifier rating exists to distinguish users who are good verifiers from users who are poor verifiers. In one of the embodiments, the rating can be determined initially by a literacy test. Then it can be changed depending on how many books the user-verifier has verified and how well he has verified them.

In one of the embodiments, a verification correctness coefficient can be entered in each book/page for each user as well. It can be computed, for example, as follows: place knowingly correct characters (an image of the letter "a" instead of the letter "a", and so on for the entire alphabet; further such characters will be referred as characters from a certain set) or in another embodiment—insert words made up of characters from a certain set, and then the percentage of characters with the proper response is the verification correctness coefficient. It's also possible to do a screening of users who are very bad at verification overall or are just doing poor verification now (for example, people who are inattentive or in a bad mood): if the verification correctness coefficient $\alpha$ is less than some percentage $\alpha_{cutoff}$, verification from this user should not be accepted at all, i.e. in this case we shall set $\alpha$=0.

Then the confidence level of a hypothesis about a character may be computed using the following formula:

$I_n = I_{n-1} + i^* \alpha^* L$, (3) where $I_n$, $I_{n-1}$, i, and L were previously entered in formula (2) and $\alpha$ is the percentage of characters from a certain set with proper responses.

After verification, the data are sent to the server where the confidence level for the character is edited based on formula (2) or formula (3), depending on whether we are using a check for correctness of verification.

Figure 9:
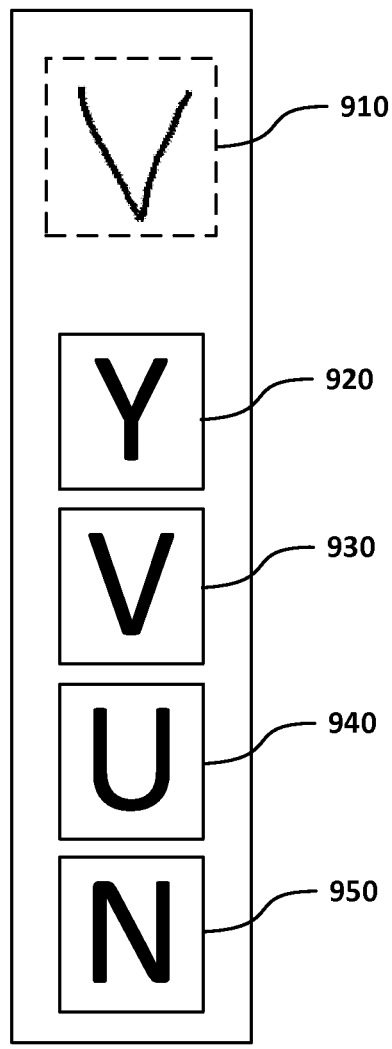
FIG. 9 illustrates an example uncertain character image and several hypotheses associated with the uncertain character.

For the situation shown in accordance with FIGS. 4, 5 a certain number of hypotheses about a certain number of characters can be checked. If a certain hypothesis was refused by users-verifiers, then it is necessary to check other hypotheses about the same character. For example, as shown in FIG. 9, the hypothesis word 410 with image of character 910 was refused. Accordingly, the hypothesis that character 910 is equivalent to character 920 ("Y") is refused. Further, the hypothesis that uncertain character 910 is any of characters 930, 940, or 950 is checked. In accordance with FIG. 3, the steps 306-320 may be repeated until all the hypotheses are refused or until all possible characters have been handled. The number of hypotheses may be artificially limited, and the sweep may be done without including all the possible characters.

If all the possible hypotheses about all the characters are gone through, 100% correctly recognized data may be obtained. This result can be sent to an external storage (108) for documents or to the client, depending on further action with the text produced.

After the verified text has been produced, the users-verifiers ratings are updated again. The rating of a user-verifier can then be increased if the verifier's responses are in accordance with the determined "correct" data and the rating of the user-verifier can be reduced if the verifier's responses are not in accordance with the determined "correct" data. Then the user rating after verification of the next fragment can be computed using the formula $$L\_H = \frac{\sum_{k=1}^{N} (i_k^{n+1} - i_k^n) * I_k}{N} + L. \quad (4)$$

where N is the number of verified characters, k is the number of the specific hypothesis made, and $I_k$ is whether it turned out to be true as a result of final verification (after verification by a large number of user-verifiers). $I_k=1$ if the hypothesis turned out to be true and $I_k=-1$ if the hypothesis turned out to be false. $i_k^n$ is the confidence level for the hypothesis prior to a check by the user-verifier, $i_k^{n+1}$ is the confidence level of the hypothesis after a check by this verifier, L is the current rating of the user-verifier, and L_H is the new rating of the user-verifier after final verification.

The arrangement and design of the elements of the systems and methods as shown in the exemplary embodiments are illustrative only. Although only a few embodiments of the present disclosure have been described in detail, those skilled in the art who review this disclosure will readily appreciate that many modifications are possible without materially departing from the novel teachings and advantages of the subject matter recited.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the scope of the appended claims.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A method comprising:
   receiving, at a processor, a set of uncertain characters obtained as a result of a recognition process of a text image, the set of uncertain characters including an image of an uncertain character, a hypothesis about the uncertain character, and a confidence level associated with the hypothesis;
   causing, by the processor, a display device to present to a user the image of the uncertain character from the set of uncertain characters over a text readout;
   receiving, at the processor from a user input, marking data for the uncertain character; and
   adjusting, using the received marking data, the confidence level associated with the hypothesis about the uncertain character for obtaining a confirmed hypothesis linked to the uncertain character.

2. The method of claim 1, wherein the marking data is one of marked, unmarked or rejected the method further comprising:
   in response to determining that the marking data is unmarked for the uncertain character, the processor increasing the confidence level of the hypothesis about the uncertain character;
   in response to determining that the marking data is marked for the uncertain character, the processor decreasing the confidence level of the hypothesis about the uncertain character; and
   in response to determining that the marking data is rejected for the uncertain character, the processor increasing the confidence level of the hypothesis about the uncertain character.

3. The method of claim 1, wherein the marking data is one of marked, unmarked, or rejected, the method further comprising:
   in response to determining that the marking data is unmarked for the uncertain character, the processor increasing the confidence level of the hypothesis about the uncertain character by a first amount; and
   in response to determining that the marking data is rejected for the uncertain character, the processor increasing the confidence level of the hypothesis about the uncertain character by a second amount, wherein the second amount is larger than the first amount.

4. The method of claim 1, further comprising, determining, prior to causing the image of the uncertain character to be presented, whether the confidence level associated with the hypothesis about the uncertain character is below a predefined non-zero threshold value, wherein the image of the uncertain character is caused to be presented in response to determining that the confidence level of the hypothesis about the uncertain character is below the threshold value.

5. The method of claim 4, further comprising:
   receiving an indication of a desired level of accuracy for recognition of text data; and
   adjusting the threshold value in accordance with an indicated desired level of accuracy.

6. The method of claim 1, wherein presenting the image of the uncertain character over the text readout comprises identifying the hypothesis character for the uncertain character in the text readout to enable inserting the image of the uncertain character over the identified hypothesis character in the text presented thereto.

7. The method of claim 1, wherein the text image is different than the text readout over which the image of the uncertain character is presented thereto.

8. The method of claim 1, wherein the marking data received from a device indicates a number of times that the image of the uncertain character was selected at the device, the method further comprising:

in response to receiving marking data indicating that the image was not selected, the processor designating the marking data for the uncertain character as unmarked;

in response to receiving marking data indicating that the image was selected an odd number of times, the processor designating the marking data for the uncertain character as marked; and in response to receiving marking data indicating that the image was selected a non-zero even number of times, designating the marking data for the uncertain character as rejected.

9. The method of claim 1, wherein the image of the uncertain character is inserted in place of a hypothesis character image within a word in the text readout, and wherein the marking data is indicative of whether the word as a whole was marked.

10. The method of claim 1, wherein the presented image of uncertain character replaces a hypothesis character image within the word.

11. The method of claim 1, wherein the processor is part of a verification device, facilitating transmission of the adjusted confidence value to a remote server system.

12. The method of claim 1, further comprising determining whether the confidence level associated with the hypothesis about the uncertain character is resolved as true, resolved as false, or not resolved;

in response to determining that the confidence level associated with the hypothesis about the uncertain character is not resolved, repeating the steps of (a) causing a display device to present the image of the uncertain character over a text readout, (b) receiving marking data for the uncertain character, and (c) adjusting the confidence level associated with the hypothesis about the uncertain character;

in response to determining that the confidence level associated with the hypothesis about the uncertain character is resolved as true, storing verified recognized text; and in response to determining that the confidence level associated with the hypothesis about the uncertain character is resolved as false, moving to check a next hypothesis about the uncertain character.

13. The method of claim 1, wherein the processor is part of a display device that is remotely connected to a server system.

14. The method of claim 1, further comprising: determining font characteristics associated with the image of the uncertain character; and adjusting font characteristics of the text readout in accordance with the determined font characteristics associated with the image of the uncertain character.

15. The method of claim 1, further comprising determining font characteristics associated with the text readout, wherein the uncertain character is chosen from a set of uncertain characters in accordance with the uncertain character being determined most similar to the determined font characteristics associated with the text readout.

16. A non-transitory computer-readable medium having stored thereon instructions executable by a processor to cause the processor to perform functions, the functions comprising:

receiving a set of uncertain characters obtained as a result of a recognition process of a text image, the set of uncertain characters including an image of an uncertain character, a hypothesis about the uncertain character, and a confidence level associated with the hypothesis;

causing a display device to present to a user the image of the uncertain character from the set of uncertain characters over a text readout;

receiving from a user input marking data for the uncertain character; and adjusting, using the received marking data, the confidence level associated with the hypothesis about the uncertain character for obtaining a confirmed hypothesis linked to the uncertain character.

17. The computer-readable medium of claim 16, wherein the marking data is one of marked, unmarked or rejected the functions further comprising:

in response to determining that the marking data is unmarked for the uncertain character, increasing the confidence level of the hypothesis about the uncertain character; in response to determining that the marking data is marked for the uncertain character, decreasing the confidence level of the hypothesis about the uncertain character; and in response to determining that the marking data is rejected for the uncertain character, increasing the confidence level of the hypothesis about the uncertain character.

18. The computer-readable medium of claim 16, wherein the marking data is one of marked, unmarked, or rejected, the functions further comprising:

in response to determining that the marking data is unmarked for the uncertain character, the processor increasing the confidence level of the hypothesis about the uncertain character by a first amount; and in response to determining that the marking data is rejected for the uncertain character, the processor increasing the confidence level of the hypothesis about the uncertain character by a second amount, wherein the second amount is larger than the first amount.

19. The computer-readable medium of claim 16, wherein the functions further comprise: determining font characteristics associated with the image of the uncertain character; and adjusting font characteristics of the text readout in accordance with the determined font characteristics associated with the image of the uncertain character.

20. The computer-readable medium of claim 16, wherein the text image is different than the text readout over which the image of the uncertain character is presented.

21. A system comprising:

a communication interface configured to receive a set of uncertain characters obtained as a result of a recognition process of a text image, the set of uncertain characters including an image of an uncertain character, a hypothesis about the uncertain character, and a confidence level associated with the hypothesis;

a processor configured to:

cause a display device to present to a user the image of the uncertain character from the set of uncertain characters over a text readout;

receive, via the communication interface from a user input, marking data for the uncertain character; and adjust, using the received marking data, the confidence level associated with the hypothesis about the uncertain character for obtaining a confirmed hypothesis linked to the uncertain character.

22. The system of claim 21, wherein the system comprises a touch-screen display, and wherein the marking data is received from a user-interface associated with the touch-screen display.

23. The system of claim 21, wherein the marking data is one of marked, unmarked or rejected, and wherein the processor is configured to: in response to determining that the marking data is unmarked for the uncertain character, increase the confidence level of the hypothesis about the uncertain character; in response to determining that the marking data is marked for the uncertain character, decrease the confidence level of the hypothesis about the uncertain character; and in response to determining that the marking data is rejected for the uncertain character, increase the confidence level of the hypothesis about the uncertain character.

24. The system of claim 21, wherein the marking data is one of marked, unmarked, or rejected, and wherein the processor is configured to: in response to determining that the marking data is unmarked for the uncertain character, increase the confidence level of the hypothesis about the uncertain character by a first amount; and in response to determining that the marking data is rejected for the uncertain character, increase the confidence level of the hypothesis about the uncertain character by a second amount, wherein the second amount is larger than the first amount.

25. The system of claim 21, wherein the processor is further configured to:
    determine font characteristics associated with the image of the uncertain character; and adjust font characteristics of the text readout in accordance with the determined font characteristics associated with the image of the uncertain character.

\* \* \* \* \*